United States Patent [19]

Kuhls et al.

[11] 4,391,940

[45] Jul. 5, 1983

[54] FLUOROPOLYMERS WITH SHELL-MODIFIED PARTICLES, AND PROCESSES FOR THEIR PREPARATION

[75] Inventors: Jürgen Kuhls, Burghausen; Franz Mayer; Herbert Fitz, both of Burgkirchen, all of Fed. Rep. of Germany

[73] Assignee: Hoechst Aktiengesellschaft, Frankfurt, Fed. Rep. of Germany

[21] Appl. No.: 358,828

[22] Filed: Mar. 16, 1982

Related U.S. Application Data

[63] Continuation of Ser. No. 214,464, Dec. 8, 1980, abandoned.

[30] Foreign Application Priority Data

Dec. 12, 1979 [DE] Fed. Rep. of Germany ........ 2949907

[51] Int. Cl.$^3$ ............................................... C08L 27/18
[52] U.S. Cl. .................................... 524/458; 524/535; 523/201; 525/276; 525/902
[58] Field of Search ............... 524/458, 535, 276, 902; 523/201

[56] References Cited

U.S. PATENT DOCUMENTS

| | | | |
|---|---|---|---|
| 3,142,665 | 7/1964 | Cardinal et al. | 260/92.1 |
| 3,654,210 | 4/1972 | Kuhls et al. | 260/29.6 |
| 3,951,930 | 4/1976 | Downer et al. | 526/82 |
| 4,036,802 | 7/1977 | Poirier | 260/29.6 |
| 4,038,231 | 7/1977 | Downer et al. | 260/29.6 F |
| 4,134,995 | 1/1979 | Fumoto et al. | 260/884 |
| 4,326,046 | 4/1982 | Miyaka et al. | 525/276 |

Primary Examiner—Joseph L. Schofer
Assistant Examiner—Bernard Lipman
Attorney, Agent, or Firm—Connolly and Hutz

[57] ABSTRACT

Fluoropolymer dispersions containing colloidal particles of a partially modified tetrafluoroethylene polymer, the fluoropolymer resin powder obtained therefrom by coagulation and a process for the preparation of the dispersions mentioned are described. The particles have a three-shell particle structure, the particle core and the other particle shell consisting of a tetrafluoroethylene polymer provided with a modifying fluoroolefinic comonomer and the inner particle shell consisting of tetrafluoroethylene homopolymer. Fluoro-olefins, perfluoro-olefins, halogenofluoro-olefins and completely or partially fluorinated vinyl ethers are used as the modifying comonomers.

The preparation is effected by the seed technique or intermediate letting down method, the modified core being formed in the first phase and the modifying comonomer being subsequently metered into the continuing tetrafluoroethylene polymerization in the second phase. The resins obtained are particularly suitable for the paste extrusion process for producing cable insulation and highly stretchable, unsintered tapes, and, after appropriate working up, also for the ram extrusion and the press-sinter technique.

14 Claims, No Drawings

FLUOROPOLYMERS WITH SHELL-MODIFIED PARTICLES, AND PROCESSES FOR THEIR PREPARATION

CROSS REFERENCE TO RELATED APPLICATION

This application is a continuation of application Ser. No. 214,464 filed Dec. 8, 1980 and now abandoned.

The invention relates to aqueous dispersions of fluoropolymers, containing colloidal particles of a partially modified tetrafluoroethylene polymer with a multi-shell particle structure of shells of different composition, to the fluoropolymer resins which are obtained therefrom by coagulation and are particularly suitable for the paste extrusion process, and to a process for the preparation of the fluoropolymer dispersions mentioned.

Tetrafluoroethylene polymers which can be extruded as pastes are in general prepared by emulsion polymerization, since only the particle aggregates obtained therefrom by coagulation are capable, as a result of their snowball-like structure and their large inner surface area, of accommodating a sufficient amount of the lubricant (usually a higher-boiling hydrocarbon) required for the paste extrusion process (J. F. Lontz et al., Ind. Eng. Chem. 44, No. 8, pages 1805 to 1810). The paste extrusion process, with which, in particular, very thin-walled shaped articles are prepared with the application of high reduction ratios (reduction ratio=ratio of the cross-section of the preform cylinder to the cross-section of the extrudate), however, places high requirements not only on the processing tools but also on the quality of the tetrafluoroethylene polymers employed, since even small processing errors and material errors can have an extremely adverse effect on the quality of the products, for example with regard to defects which, in the case of thin-walled shaped articles, manifest themselves in the form of holes and cracks or which impair the mechanical and/or electrical properties of the products.

A large number of tetrafluoroethylene polymers which are said to be particularly suitable for the production of improved paste extrudates, as far as possible with the application of high reduction ratios during the extrusion, have thus already been developed. Whilst pure homopolymers of tetrafluoroethylene—even those which have been prepared using a colloidal seed of previously formed polytetrafluoroethylene in the emulsion polymerization of tetrafluoroethylene—scarcely fulfil these requirements in practice, it is known that so-called modifying agents added during the polymerization can improve the ease of extrusion as a paste (U.S. Pat. No. 3,142,665). Possible modifying agents of this type which are present in the polymerization of tetrafluoroethylene are either regulating chain transfer agents which are not, however, capable of polymerization, such as, for example, methanol, or, particularly advantageously, fluorinated monomers which are capable of copolymerizing with tetrafluoroethylene, such as, for example, perfluoropropene, a perfluoroalkyl vinyl ether or a halogen-substituted or hydrogen-substituted fluoro-olefin. The total amount of this comonomer modifying agent should be so low that the specific properties of the pure polytetrafluoroethylene are retained (that is to say, above all: no possibility of processing from the melt because of the extremely high melt viscosity, but instead outstanding stability to heat and inert properties even towards extremely aggressive media), in contrast to the use of relatively high amounts of such comonomers in the polymerization which produces true tetrafluoroethylene copolymers which can be processed from the melt by thermoplastic shaping methods but no longer have certain desired properties of polytetrafluoroethylene (including modified polytetrafluoroethylene).

In detail, it has been disclosed that the modifying agent is present during the entire polymerization operation, by which means the particles formed are substantially uniformly modified throughout (U.S. Pat. No. 3,142,665, Belgian Pat. No. 654,084, U.S. Pat. No. 3,951,930 and U.S. Pat. No. 3,819,594). It is said to be possible to achieve certain improvements by selecting particular catalysts or dispersing agents or by the nature of their addition. Attempts have also already been made to prepare modified polytetrafluoroethylene, the particles of which have two zones (particle core and particle shell) modified differently, it being possible for this difference to be of a qualitative or quantitative nature, that is to say different modifying agents can be present in each zone (including the variant in which one of the two zones consists of non-modified polytetrafluoroethylene), and/or the same modifying agent is present in each zone in a different concentration (U.S. Pat. Nos. 3,142,665, 3,654,210, 4,038,231, 4,036,802 and 4,134,995). Such particles with two zones modified differently are obtained either by initially introducing a colloidal dispersion containing seed particles in the emulsion polymerization for the preparation of these tetrafluoroethylene polymers, onto which seed particles a qualitatively and/or quantitatively different monomer mixture of tetrafluoroethylene and modifying agent (or, if appropriate, pure tetrafluoroethylene) is polymerized, or by interrupting the polymerization at a certain point in time and continuing the polymerization with a different monomer composition. Particular comonomer modifying agents have also already been used, for example fluorinated cyclic ethers (U.S. Pat. No. 4,036,802 and U.S. Pat. No. 4,058,578), but these serve to provide specific improvements in properties.

The paste extrusion properties could in many respects be improved with all these modified polytetrafluoroethylene resins described, but they still cannot yet be uniformly extruded completely satisfactorily at high reduction ratios, and there is also the aim of further reducing the extrusion pressure required at a given reduction ratio, since high pressures are undesirable because of the high load on the processing tools.

Furthermore, the known modified tetrafluoroethylene resins are products which are specifically tailored for paste extrusion. However, paste extrusion processing is a relatively limited area within the overall field of polytetrafluoroethylene processing. There is thus also the aim of imparting to such polytetrafluoroethylene resins which are extruded as a paste or to the primary dispersions obtained in the emulsion polymerization, a combination of properties which render them also suitable, to a high degree, for other fields of use, such as, for example, for the ram extrusion and press-sinter processing usually reserved for suspension polymers, for coating with the aid of aqueous dispersions and for producing tapes and films which can be processed, with high stretching ratios and stretching rates, to porous structures.

The present invention provides, for the requirements mentioned, improved aqueous fluoropolymer dispersions containing colloidal particles of a partially modified tetrafluoroethylene polymer with a multi-shell particle structure of shells of different composition (by the term individual "shell" there being understood, in the following text, both the particle core and the two surrounding shells of the particle), and the pulverulent fluoropolymer resins formed therefrom by coagulation. The fluoropolymer dispersions mentioned have particles consisting essentially of (a) a particle core comprising a polymer of 0.05 to 6% by weight of units of at least one modifying fluoro-olefinic comonomer of the formulae

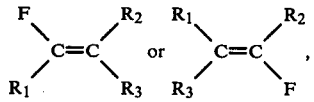

wherein $R_1$ is H, Br or Cl; $R_2$ is F or $R_f^1$, $R_f^1$ denoting a perfluoroalkyl radical with 1 to 4 C atoms; and $R_3$ is $R_1$ or $R_2$;

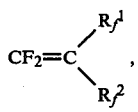

wherein $R_f^1$ is a perfluoroalkyl radical with 1 to 4 C atoms and $R_f^2$ is F or a perfluoromethyl radical;

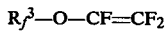

wherein $R_f^3$ is a perfluoroalkyl radical with 1 to 5 C atoms; or

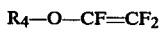

wherein $R_4$ is a radical $XCF_2-(CF_2)_m-$, in which $X=H$ or Cl and m denotes an integer from 0 to 4, and units of tetrafluoroethylene, the proportion of the particle core being 2 to 60% by weight of the total particle, (b) an inner particle shell, immediately adjacent to the particle core, of a polymer consisting essentially of tetrafluoroethylene units, and (c) an outer particle shell, immediately adjacent to the inner particle shell, of a polymer comprising 0.1 to 15% by weight of units of at least one modifying fluoro-olefinic comonomer of the formulae (a¹), (a²), (a³) and (a⁴), these formulae being as defined under (a), and units of tetrafluoroethylene, the weight ratio of the inner particle shell to the outer particle shell being 25:75 to 99.5:0.5.

By the comonomers described by the formulae (a¹), there are also to be understood, in each case, the possible stereoisomers (cis- or trans-isomers).

As preferred comonomers contained in the particle core in addition to tetrafluoroethylene units there may be mentioned:

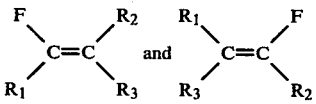

wherein $R_1$ is H or Cl; $R_2$ is F or $CF_3$; and $R_3$ is F or $CF_3$; or wherein $R_1$ is H or Cl; $R_2$ is F; and $R_3$ is $C_2F_5$.

Such preferred comonomers are, for example, trifluoroethylene, pentafluoropropene, heptafluorobutene, heptafluoroisobutene, trifluorochloroethylene, chloropentafluoropropene, chloroheptafluorobutene and chloroheptafluoroisobutene. Trifluorochloroethylene and trifluoroethylene are particularly preferred from this group.

Preferred comonomers which the particle core can contain are also those of the above formulae (a¹) wherein $R_1$ is H or Cl; $R_2$ is F, $CF_3$ or $C_2F_5$; and $R_3$ is H or Cl.

Examples of such comonomers which may be mentioned are difluoroethylene, dichlorodifluoroethylene, chlorodifluoroethylene, tetrafluoropropene, chlorotetrafluoropropene and chlorohexafluoro-butene and -isobutene. Of this group, 1,1-difluoroethylene(vinylidene fluoride) is to be singled out in particular.

Further preferred comonomers contained in the particle core in addition to tetrafluoroethylene units are those of the formula

wherein $R_f^1$ is $CF_3$ or $C_2F_5$ and $R_f^2$ is $CF_3$ or, preferably, F. Examples of these comonomers are perfluoropropene, perfluoro-1-butene and perfluoroisobutene. Perfluoropropene is particularly preferred. As further preferred comonomers for modifying the particle core there may be mentioned those of the formula

wherein $R_f^3$ is a perfluoroalkyl radical with 1 to 3 C atoms, particularly preferably the perfluoro-n-propyl radical.

Other suitable comonomers which can be incorporated in the particle core as modifying fluoro-olefinic monomer units are, furthermore, polyfluorinated ethers of the formula

wherein $R_4$ is a radical of the formula $XCF_2-(CF_2)_m-$ (m = an integer from 0 to 4 and X=H or Cl).

The proportion of these modifying fluoro-olefinic comonomers contained in the modified emulsion polymer which constitutes the particle core is 0.05 to 6% by weight, preferably 0.1 to 5% by weight, of the units incorporated therein. The remaining units incorporated, to make up to 100% by weight, are those of tetrafluoroethylene. The comonomer content can also consist of mixtures of 2 or more of the fluoro-olefinic compounds mentioned.

The inner particle shell immediately adjacent to this particle core is composed exclusively of units of tatrafluoroethylene, that is to say it is a homopolymer of this monomer, prepared by polymerization in aqueous emulsion.

An outer particle shell is immediately adjacent to this inner particle shell of polytetrafluoroethylene. This outer shell is formed from a polymer composed of units of at least one modifying fluoro-olefinic comonomer of the abovementioned formulae (a¹), (a²), (a³) and (a⁴), wherein $R_f^1$, $R_f^2$, $R_f^3$, $R_1$, $R_2$, $R_3$, $R_4$, m and n have the abovementioned meaning, and of tetrafluoroethylene units.

Preferred comonomers which constitute the modifying content of the outer particle shell are, above all, those with the abovementioned preferred and particularly preferred definitions with regard to the particle core (a). It is likewise possible for mixtures of 2 or more of the fluoro-olefinic comonomers mentioned to be present, for modification, in the outer particle shell.

The proportion of these fluoro-olefinic comonomers contained in the modified emulsion polymer which constitutes the outer particle shell is 0.1 to 15% by weight, preferably 0.1 to 12% by weight and in particular 0.1 to 10% by weight, of the units incorporated therein. The remainder of the units in the polymer, to make up to 100% by weight, are those of tetrafluoroethylene.

By the term "immediately adjacent" it is to be understood, in this context, that the individual shells, that is to say the particle core and the inner and outer surrounding shells of the particle, form an integral complete particle, these shells being inseparably bonded to one another by the polymerization operation.

The proportion of particle core in these complete particles is 2 to 60% by weight, preferably 5 to 50 and in particular 5 to 20% by weight. The weight ratio of inner particle shell to outer particle shell is 25:75 to 99.5:0.5.

Within the context of the invention, the fluoropolymer dispersion with a three-shell particle structure can to a certain extent be "tailor-made" for the particular intended use by achieving optimum matching of the properties in a controlled manner by small changes in the composition or the preparation conditions, but above all by varying the extent of the inner particle shell, within the given limits. Thus, those products which contain perfluorinated comonomers of the abovementioned groups (a$^2$) and (a$^3$), in particular perfluoropropene and perfluoro(propylvinyl)-ether, in the particle core and in the outer shell are particularly suitable (after treatment by means of the precipitation granulating technique described below) for processing by the press-sinter technique and by the method of ram extrusion. The weight ratio of the inner particle shell to the outer particle shell in these products is preferably 25:75 to 75:25. In principle, all products are suitable for use in the paste extrusion process (strand and wire extrusion) and for producing unsintered tapes which allow a high degree of stretch, but those products in which the weight ratio of the inner particle shell to the outer particle shell is 75:25 to 99.5:0.5, preferably 80:20 to 99.5:0.5, are particularly suitable. These are a preferred embodiment of the invention. The said comonomers of groups (a$^1$) to (a$^4$) can be present in the particle core and in the outer shell of these products.

The above statements regarding the composition of the particle core and of the inner and outer particle shells are valid, with the proviso that the polymer formed from the complete particles cannot be processed from the melt (by customary processing methods for thermoplastics), that is to say it has a melt viscosity (shear viscosity) of ≧0.1 GPas, measured in accordance with the method of Ajroldi et al, (creep test), described in J. appl. Polym. Sci. 14, 1970, page 79 et seq. A precise experimental description of the method is given in U.S. Pat. No. 4,036,802, column 9, line 46, to column 10, line 41. It has been carried out here, with the following changes: elongation measurement at 350° C., testpieces 0.25 cm wide and 0.65 cm thick and with a measured length of 3.5 cm before elongation at room temperature.

The present invention furthermore relates to a process for the preparation of aqueous fluoropolymer dispersions containing colloidal particles of a partially modified tetrafluoroethylene polymer with a multi-shell particle structure of shells of different composition by emulsion polymerization of tetrafluoroethylene with modifying fluoro-olefinic comonomers, which can be copolymerized with tetrafluoroethylene, in the presence of customary catalysts and emulsifiers. This process comprises (A) first preparing a colloidal seed dispersion with a polymer solids content of 3 to 18% by weight, relative to the total weight of the aqueous seed dispersion, by emulsion polymerization of tetrafluoroethylene and at least one modifying fluoro-olefinic comonomer of the formula

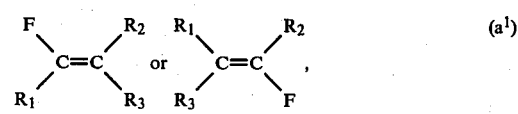

wherein R$_1$ is H, Br or Cl; R$_2$ is F or R$_f^1$, R$_f^1$ denoting a perfluoroalkyl radical with 1 to 4 C atoms; and R$_3$ is R$_1$ or R$_2$;

wherein R$_f^1$ is a perfluoroalkyl radical with 1 to 4 C atoms and R$_f^2$ is F or a perfluoromethyl radical;

wherein R$_f^3$ is a perfluoroalkyl radical with 1 to 5 C atoms; or

wherein R$_4$ is a radical XCF$_2$—(CF$_2$)$_m$—, in which X=H or Cl and m denotes an integer from 0 to 4, the amount of this fluoro-olefinic comonomer being such that the proportion of its units in the seed particles formed is 0.05 to 6% by weight;

(B) then continuing the emulsion polymerization in the presence of this colloidal seed dispersion from stage (A), if appropriate after reducing the solids content by dilution, by forcing in tetrafluoroethylene and continuing to feed in tetrafluoroethylene to maintain a pressure of 5 to 30 bars, until the solids content of the final dispersion has reached 8 to 40% by weight, the amount of colloidal seed dispersion present being such that the particle cores formed from the seed particles comprise 2 to 60% by weight of the particles of the final dispersion, and (C) feeding at least one modifying fluoro-olefinic comonomer of the formulae (a$^1$), (a$^2$), (a$^3$) and (a$^4$), wherein these formulae are as defined under (A), into the continuing emulsion polymerization of stage (B) when a degree of conversion in the range from 25 to 99.5% by weight has been reached, relative to the consumption of tetrafluoroethylene up to the intended solids content of the final dispersion, the amount fed in being such that the proportion of comonomer units in the outer particle shell which forms is 0.1 to 15% by weight.

The individual stages (A), (B) and (C) of the process according to the invention are carried out as follows:

In stage (A), a seed dispersion is first prepared by methods which are in themselves known for emulsion polymerization of tetrafluoroethylene. Emulsion polymerization is carried out in an aqueous phase, at least one of the modifying fluoro-olefinic comonomers of the formulae $(a^1)$, $(a^2)$, $(a^3)$ and $(a^4)$ according to the definitions given above (or a mixture of such comonomers) being present in an amount such that the proportion of the incorporated units of these comonomers in the particles formed in the emulsion polymerization comprises 0.05 to 6% by weight, preferably, 0.1 to 5% by weight (the remainder to make up to 100% weight are units of tetrafluoroethylene). Because of the different rates of polymerization of tetrafluoroethylene on the one hand and of the modifying fluoro-olefinic comonomers on the other hand, it is necessary for these fluoro-olefinic compounds to be present in the monomer phase in a higher proportion than that which corresponds to the proportion of incorporated units thereof in the seed polymer particle (particle core). The excess required depends on the nature of the comonomer employed and thus on its rate of polymerization, which is known to the expert. For the groups $(a^1)$ to $(a^4)$ mentioned, this excess (that is to say the amount of modifying comonomer, relative to the amount of tetrafluoroethylene to be consumed, which equals 100, until the intended solids content is reached) is about 1.05 times to 12 times, preferably about 1.05 times to 10 times, the amount in % by weight incorporated in the seed polymer. In particular, this excess should be about 2 to 9 times, preferably 2.5 to 7 times, for perfluoropropene, 3 to 12 times, preferably 4 to 10 times, for perfluoro(propylvinyl)-ether and 1.05 to 2 times, preferably 1.05 to 1.5 times, for chlorotrifluoroethylene and vinylidene fluoride.

When the particular polymerization has been reached, the monomeric tetrafluoroethylene is metered in via a suitable measuring and regulating device, the polymerization pressure being maintained by topping up with tetrafluoroethylene and the amount added being indicated. When the amount of tetrafluoroethylene fed in reaches that amount required for the particular intended, pre-determined solids content of the seed dispersion, the polymerization is discontinued by letting down the pressure. The required amount of the modifying comonomer, based on this tetrafluoroethylene consumption, is metered in, and in particular, the total amount is preferably metered in before the start of the polymerization. It is possible to subsequently feed in part amounts, but in this case it should be ensured that a sufficient amount of modifying agent is present at any point in time.

The emulsion polymerization for the preparation of the seed dispersion according to stage (A) is carried out in an aqueous phase under customary pressures of 5 to 30 bars, preferably 8 to 16 bars, and at temperatures of 10° to 70° C., preferably 20° to 40° C., in the presence of water-soluble catalysts which form free radicals and are customary for the emulsion polymerization of fluoroolefins, and which should be as inactive as possible as telogens. These can be water-soluble peroxidic compounds, such as inorganic or organic peroxides, diacyl peroxides or peracids, including water-soluble salts thereof, such as, for example, perborates, percarbonates and, in particular, persulfates (preferably alkali metal salts or ammonium salts).

Water-soluble redox initiator systems, that is to say combinations of one of the peroxidic compounds mentioned and a reducing component, such as, for example, a water-soluble disulfite, thiosulfate, dithionite, bisulfite or sulfinate, or also a compound which gives a diimine, such as azodicarboxylic acid and salts thereof, or azodicarboxamide, are preferred. Preferred redox initiator systems are combinations of alkali metal persulfate or ammonium persulfate with alkali metal disulfite or bisulfite.

Furthermore, ammonium salts, alkali metal salts and alkaline earth metal salts of permanganic acid, manganic acid or manganous acid, in particular potassium permanganate, can also advantageously be used as initiators.

The amounts of catalyst are in the range customary for emulsion polymerization of fluoro-olefins. They are 0.00005 to 0.1% by weight, preferably 0.0005 to 0.03% by weight, relative to the aqueous polymerization medium (the oxidizing component being meant in the case of redox systems). The known addition of small amounts of co-catalysts, for example of water-soluble salts of copper, iron or silver, can also advantageously be utilized in the case of redox systems.

The polymerization is carried out in the customary manner in the pH range maintained in emulsion polymerization of fluoro-olefins, the pH range depending on the nature of the initiator employed as being from 4 to 9. Known buffer substances can be present.

Emulsifiers such as are usual and customary for emulsion polymerization of tetrafluoroethylene and such as are described, for example, in U.S. Pat. No. 2,559,752 are also employed for the emulsion polymerization in stage (A) of the process according to the invention. Examples which may be mentioned are the alkali metal salts and ammonium salts of longer-chain perfluorocarboxylic acids, ω-hydroperfluorocarboxylic acids, chlorofluorocarboxylic acids, perfluorodicarboxylic acids and also perfluorosulfonic acids and perfluorophosphonic acids. Such emulsifiers preferably have a carbon chain of 6 to 12 C atoms. Preferred emulsifiers in the context of the process according to the invention are the ammonium salts of ω-hydroperfluorooctanoic acid and, in particular, of perfluorooctanoic acid. Salts of perfluoropropoxypropionic acid may be mentioned as a further example of a class of particularly effective emulsifiers.

If appropriate, the emulsifiers mentioned can also be employed in the form of the free acids and neutralized with ammonia. The emulsifiers employed should be as inactive as possible as telogens.

The amounts of emulsifier are within the limits customary for emulsion polymerization of fluoro-olefins. They are about 0.02 to 0.5% by weight, preferably about 0.05 to 0.3% by weight, relative to the aqueous polymerization medium.

The emulsion polymerization for obtaining these colloidal seed dispersions in stage (A) is continued until an aqueous seed dispersion with a solids content of 3 to 18% by weight, preferably 5 to 15% by weight, relative to the total weight of the resulting aqueous fluoropolymer dispersion, has been formed. The transition point of the crystalline phase of the fluoropolymer particles of this seed dispersion is 290° to 322° C., preferably 300° to 317° C. The seed dispersion prepared predominantly contains spherical-shaped fluoropolymer particles of uniform size in the colloidal particle size range (average diameter of 0.01 to 0.2 μm preferably 0.03 to 0.15 μm).

In process stage (B), the emulsion polymerization is continued with this colloidal seed dispersion prepared according to stage (A). This continuation can be effected by initially introducing the seed dispersion (A), prepared in a separate operation, into the reaction vessel, whereupon the catalyst and emulsifier and, if appropriate, other polymerization auxiliaries are added in the amount required for stage (B) (including stage (C), appropriately in the form of aqueous solutions, before continuation of the emulsion polymerization. As in stage (A), these polymerization ingredients can also be added by a procedure in which a part amount is initially introduced and the residual amount required is subsequently fed into the vessel, via suitable lines, batchwise or continuously, in the course of the particular polymerization (stage A or B+C). Continuous addition during the entire polymerization process (A+B+C) is likewise possible.

However, it is also possible to continue the emulsion polymerization of stage (A) by a procedure in which, after the emulsion polymerization in state (A) has ended, the mixture is intermediately let down, the monomer phase being removed, and tetrafluoroethylene is then forced in and the emulsion polymerization is started again. In this case, it is expedient already to add the total amount of catalyst and emulsifier and, if appropriate, other auxiliaries for stage (B), including (C), at the start of stage (A). However, it is also possible, as described above, to subsequently feed in these components in part amounts or continuously.

The amount of seed dispersion from stage (A) which is present at the start of stage (B) is chosen such that the seed particles which are contained therein and which form the particle cores of the three-shelled complete particles obtained comprise 2 to 60% by weight, preferably 5 to 55% by weight and in particular 5 to 50% by weight of the particles of the final dispersion, that is to say of the three-shelled complete particles. This amount is obtained by an initially introduced amount of seed solids which corresponds to the particular intended solids content of the final dispersion (that is to say of the product of stage B+C) and by the metered and measured addition of tetrafluoroethylene (including the fluoro-olefinic comonomers of stage C which are fed in) during polymerization step B) and interruption of the polymerization by letting down the mixture when the solids content of the final dispersion has been reached.

If appropriate, the aqueous seed dispersion according to (A) which is present at the start of stage (B) is diluted with water, so that the initial solids content is 0.5 to 15% by weight, preferably 1 to 10% by weight. The emulsion polymerization of stage (B) (including C) is carried out until the solids content is 8 to 40% by weight, preferably 12 to 30% by weight and in particular 15 to 25% by weight, of the final dispersion obtained. When the degree of conversion has reached a value in the range from 25 to 99.5% by weight, a modifying fluorinated comonomer of the formula ($a^1$), ($a^2$), ($a^3$) or ($a^4$) or a mixture of such comonomers is now metered, according to (C), into this continuing emulsion polymerization of tetrafluoroethylene in stage (B). As described above with respect to the ratio of the inner shell to the outer shell, it may be expedient, for certain intended uses, to meter in the comonomer in an amount in the range from 25 to 75%, but it is preferable to meter in the comonomer in an amount in the range from 75 to 99.5%, in particular in the range from 80 to 99.5%. The degree of conversion mentioned is obtained from the consumption of tetrafluoroethylene in stage B+C, relative to the consumption corresponding to the intended solids content of the final dispersion. It can be established, as described above, with an appropriate measuring and regulating device.

The statements made above regarding preferred comonomers in the outer particle shell apply with regard to the comonomers preferably employed in stage C.

In order to achieve the intended content of modifying fluorinated comonomers of 0.1 to 15% by weight, preferably of 0.1 by 12% by weight and in particular of 0.1 to 10% by weight, of the units incorporated in the outer particle shell, the required amount of this modifying comonomer is fed into stage (C), and in particular, preferably, the entire amount is fed in when the appropriate degree of conversion has been reached. However, it is also possible to add a part amount at this degree of conversion and subsequently to meter in further part amounts in the period which remains until the polymerization is discontinued. The excess of modifying fluoro-olefinic comonomers (given as the factor of comonomer employed in stage C) in % by weight, relative to the tetrafluoroethylene consumption in stage (C)=100%, over the % by weight proportion thereof incorporated in the outer particle shell) should in general be somewhat higher than in the case of stage (A), especially if it is fed in at relatively high degrees of conversion. Depending on the nature of the modifying fluoro-olefinic comonomer, it should be about 1.1 times to 40 times, preferably 1.1 times to 30 times, the proportion to be incorporated. In particular, this excess should be about 1.1 to 5 times, preferably 1.1 to 3 times, for chlorotrifluoroethylene and vinylidene fluoride, about 3 to 30 times, preferably 3 to 25 times, for perfluoropropene and about 8 to 40 times, preferably 10 to 30 times, for perfluoro(propylvinyl)-ether. If the modifying comonomer is fed in at degrees of conversion of 75% or more, these statements apply with the proviso that the amount of modifying comonomer added can be up to 500% by weight, preferably up to 200% by weight, of the amount of tetrafluoroethylene still to be consumed.

In stages (B) and (C), the addition of the tetrafluoroethylene is also controlled and followed quantitatively with a measuring and regulating device, as described above.

The emulsion polymerization in stages (B) and (C) is carried out under the same polymerization conditions as has been described above (including the preferred statements) for stage (A). These statements apply particularly with regard to the ranges for the polymerization pressure, for the polymerization temperature, for the pH value and for the nature and amount of the catalysts and emulsifiers employed. With regard to the amount of catalyst, however, it is advisable to remain in the lower region of the range indicated (about 0.00005 to 0.001% by weight, relative to the aqueous medium, if the modifying fluoro-olefinic comonomer is fed in at a degree of conversion of 75% or more.

Small amounts of agents for stabilizing the colloidal dispersions formed are advantageously added to the aqueous polymerization medium for stages (B) and (C). Such dispersion stabilizers which can be employed are terpene hydrocarbons, in particular unsaturated cyclic terpene hydrocarbons, and oxygen-containing derivatives thereof as described in U.S. Pat. No. 3,707,519. Examples which may be mentioned in this context are terpinene, pinene, dipentene, camphene, terpineol and camphor or mixtures of such terpenes, such as are commercially available, for example, under the trade names Depanol ® or "Terpen B." Non-polymerizable organic compounds which contain at least one ether bridge in the molecule and, in addition to carbon and hydrogen, can also contain polar, functional groups in the molecule, such as, for example, hydroxyl, carboxyl, ester or amide groups, are preferably suitable as such dispersion stabilizers. The said compounds containing ether bridges should be soluble in water at least to the extent of 20% by weight, preferably to the extent of 50% by weight or more. Examples of such compounds containing ether bridges are the polyethylene glycols, such as preferably, diethylene glycol and triethylene glycol, which are readily water-soluble up to the high-molecular members of this homologous series, and furthermore the polypropylene glycols, such as di- and tri-propylene glycol, which are sufficiently water-soluble up to a molecular weight of about 600, as well as water-soluble mixed polyglycols of ethylene oxide and propylene oxide units. There may also be mentioned the appropriately water-soluble alkyl ethers, alkylaryl ethers and aryl ethers (monoethers and diethers) of ethylene glycol and propylene glycol and of the abovementioned polyglycols, for example ethylene glycol monomethyl ether, ethylene glycol monobutyl ether and ethylene glycol diethyl ether, as well as nonylphenol polyglycol ether and triisobutylphenol polyglycol ether. Suitable compounds with polar, functional groups in the molecule are, furthermore, the polyglycol esters, for example diethylene glycol monoesters and diesters of fatty acids and polyoxyalkylates of fatty amines. The use of such compounds is known from Canadian Pat. No. 824,195. Dispersion stabilizers of particular preferred interest are, furthermore, cyclic ethers with 5 or 6 ring members, such as, for example, 1,3,5-trioxane, 1,3-dioxolane, 2-methyl- and 2,2-dimethyl-dioxolane and, particularly preferably, 1,3- and 1,4-dioxane and tetrahydrofuran.

The dispersion stabilizers mentioned are added in amounts of 1 to 40, preferably 5 to 30, parts by weight per million parts by weight of aqueous polymerization medium, and in particular either the total amount is initially introduced at the start of stage (B), or the stabilizer is subsequently fed in continuously or batchwise during stage (B) (before the start of C), or, particularly preferably, the total amount is added approximately when the feeding in of the modifying fluoro-olefinic comonomer is started (that is to say at the start of stage C).

Known anticoagulants, such as longer-chain paraffin hydrocarbons, paraffin waxes or so-called white oils, which should be water-insoluble and liquid under the conditions of the polymerization, can be present as further polymerization auxiliaries in all stages of this emulsion polymerization process.

Finally, very small amounts (0.0001 to 0.1% by weight, preferably 0.0005 to 0.01% by weight, relative to the weight of the aqueous polymerization medium) of non-polymerizable chain transfer agents which do not contain fluorine can be added to the aqueous polymerization medium in all stages. Examples of chain transfer agents which may be mentioned in this context are hydrogen, propane, chloroform, carbon tetrachloride and methanol.

The modified polytetrafluoroethylene dispersion obtained in this manner when the polymerization operation in stage (C) has ended can be coagulated by customary and known processes. This can be effected, for example, by mechanical coagulation with the aid of a high-speed stirrer, or by atomizing under pressure. The dispersions obtained can also be precipitated, for example by adding acids or electrolytes. The moist coagulate powder thus obtained is dried in the customary manner at temperatures of about 30 to about 250° C., preferably of about 50° to 180° C. This fluoropolymer resin powder coagulated in this manner, which consists of agglomerated primary particles, the agglomerates having an average particle diameter of 200 to 800 $\mu$m, preferably of 350 to 700 $\mu$m, and in which the primary particles have the three-shell structure defined above, is a further subject of the invention. This coagulated fluoropolymer resin is the improved processing material for the paste extrusion process.

Fillers and pigments such as are known and customary, to the expert, for fluoropolymer dispersions can be added to the aqueous, colloidal fluoropolymer dispersions, according to the invention, with a multi-shell particle structure if this is advantageous for the envisaged use. Of the large number of fillers and pigments available to the expert, there may be mentioned here, for example, metal powders of pure metals, such as, for example, copper, aluminum or iron, or alloys, such as bronze; compounds of metals, such as, for example, their oxides or sulfides; and non-metals and non-metal compounds, such as graphite, carbon black, silicon dioxide, glass fibers, talc and mica. The fillers mentioned can be coagulated together with the fluoropolymer dispersions according to the invention, in which case, if appropriate, a cationic agent, as described in U.S. Pat. No. 3,793,287, is present or the filler is pre-treated in a suitable and known manner. It is also possible to admix fillers and pigment to the already coagulated resin in the dry state.

The shell-modified tetrafluoroethylene polymers according to the invention which are described above have a number of surprising advantages which render them particularly suitable for use in the fields of application described below:

When the tetrafluoroethylene polymers according to the invention are used in the production of shaped articles by the conventional paste extrusion process, considerably lower extrusion pressures are required, even at very high reduction ratios (up to 4000:1), the extrusion proceeding exceptionally uniformly and a well-orientated extrudate with high strength values and smooth surfaces resulting. A reduction in the extrusion pressure at high reduction ratios is a considerable advantage from the point of view of processing, since the processing tools (preforming unit and dies) no longer have to be designed for use under extremely high pressures. In the case of the widely used processing to unsintered tapes with the aid of the paste extrusion process, the undesired stiffness of such tapes is avoided or reduced.

Furthermore, the shell-modified tetrafluoroethylene polymers, according to the invention, described above have an outstanding combination of properties of low standard density (SSG=standard specific gravity), excellent stability to heat and good fusibility of the particle surface. These properties make them suitable for use for the production of shaped articles by the so-called press-sinter technique or by the ram extrusion process, which production can usually be carried out only with suspension polymers. The aqueous dispersions primarily obtained can be particularly easily converted into free-flowing powders with a high bulk density, and in particular, preferably, by a process as is described in German Patent Application No. P 29 49 908.9. In this process, the polymer dispersion to be converted into a free-flowing powder is initially adjusted to a solids content of about 5 to 15% by weight and is then stirred at 10° to 85° C. with an energy of 4 to about 200 J.s$^{-1}$.l$^{-1}$, if appropriate with the addition of up to 2% by weight, relative to the dispersion, of a water-soluble dissociating inorganic salt which contains an ammonium cation or a metal cation and/or of a water-soluble acid, whereupon the pH value of the dispersion is adjusted to 0 to 6, until the dispersion has been thickened sufficiently, which is indicated by clearly visible optical inhomogeneities, and 1 to 5% by weight, relative to the dispersion, of an organic liquid which wets the dispersion particles and is soluble in water at 20° C. to the extent of less than 15% by weight, is then added 0 to 10 minutes later, without intermediate separation, drying and grinding of the polymer, and stirring is continued under the conditions mentioned, until granules are formed. The resulting free-flowing powder with a high bulk density formed is a product which is outstandingly suitable for the automatic charging machines used at present, especially the charging machines in the case of ram extrusion.

The shell-modified tetrafluoroethylene polymers according to the invention, such as have been described above, also have a reduced porosity and at the same time an increased mechanical strength when used in the form of dispersions for impregnating fabrics, such as, for example, glass fiber fabrics, or also as fine powders for incorporation in such an impregnating layer, the excellent stability to heat also being an additional advantage.

Finally, the shell-modified tetrafluoroethylene polymers according to the invention represent a material which can be shaped to strands by the paste extrusion process at a low reduction ratio and can then be calendered to give unsintered tapes and, if appropriate, the tapes can be stretched, it being in turn possible to stretch the unstretched tapes, applying high stretching ratios and stretching speeds, to give porous products. The mechanical properties (tensile strength, elongation at break) of these products are considerably improved.

The following examples are intended to illustrate the invention:

(1a) PREPARATION OF THE SEED DISPERSION ACCORDING TO STAGE (A) (EXAMPLES 1 TO 30, 32 TO 44)

31 l of deionized water, 0.75 cm$^3$ of 2% strength by weight aqueous copper-II sulfate solution, 27.5 g of perfluorooctanoic acid and 37.5 cm$^3$ of 18% strength by weight aqueous ammonia solution are introduced into a polymerization autoclave with an empty volume of 47 l (enameled and provided with an imepller-type stirrer) and, after flushing the autoclave several times with nitrogen, the amounts of modifying agent for stage A given in Table I (see columns 2 and 3), relative to the amount of tetrafluoroethylene consumed, are then subsequently metered in, as a liquid or gas, depending on the state of aggregation, against a weak stream of tetrafluoroethylene until the intended solids content is reached. The pressure is then increased to 13 bars by passing in tetrafluoroethylene and is kept at 13 bars by passing further tetrafluoroethylene in, and the polymerization is started by subsequently metering in 1.2 g of sodium bisulfite and 1.15 g of ammonium persulfate (in the form of aqueous solutions), whilst stirring. The polymerization is carried out at a temperature of 35° C. until the solids content of the colloidal dispersion is 10% by weight, or 15% by weight in Example 33, relative to the aqueous medium.

(1b) POLYMERIZATION STAGE B AND C (EXAMPLES 1 TO 30, 32 TO 44)

37 l of deionized water, 27.3 g of perfluorooctanoic acid, 37.5 cm$^3$ of ammonia (18% strength by weight solution in water, 0.93 cm$^3$ of aqueous copper-II sulfate solution (2% strength by weight) and 6.6 kg of aqueous colloidal seed dispersion according to stage A (solids content: 10% by weight, or 15% by weight in Example 33) are initially introduced into a similar 47 l polymerization autoclave.

After flushing the autoclave several times with nitrogen, the pressure is increased to 13 bars by passing in tetrafluoroethylene and is kept at 13 bars by passing further tetrafluoroethylene, and the polymerization is started by subsequently metering in 1.37 g of sodium bisulfite and 2.18 g of ammonium persulfate in the form of aqueous solutions, whilst stirring. The polymerization is carried out at a temperature of 28° C. When the degree of conversion indicated in column 7 of Table I is reached, which is based on the total consumption of tetrafluoroethylene in stages B and C to give the intended solids content, the modifying agent given in column 5 is added in the amount mentioned in column 6, relative to the tetrafluoroethylene consumed in stage C until the intended final solids content is reached. The dispersion stabilizer given in columns 9 to 11 is also added, either at the given degree of conversion of tetrafluoroethylene or as an initial component at the start of stage B (DEG=diethylene glycol, dioxane=1,4-dioxane). The incorporation, that is to say the proportion of modifying agent, in the particle core (a) and the outer particle shell (c) (for the determination method, see paragraph 3), and the proportion of the particle core formed by the seed on the total polymer are also given in Table I (columns 4, 8 and 12). The proportion of the particle core formed by the seed is obtained from the proportion by weight of the initially introduced seed polymer in the amount by weight of the total polymer.

All stages of Examples 10 to 13 were carried out in an autoclave with an empty volume of 188 l. In these cases, the amounts used in the above recipe are to be multiplied by a factor of 4.

In Examples 24 to 30 and 32, 96 mg of ammonium persulfate and 23 mg of azodicarboxamide are employed, in aqueous solutions, as the redox catalyst.

In Example 32, 60 ppm of methanol are added as a chain transfer agent at the start of stage B. The end dispersions of Examples 26, 28 and 29 are polymerized to a final solids content (stages B and C) of 16, 17 and 17% by weight, and in all the other examples the final solids content is 20% by weight.

(2) PROCEDURE FOR EXAMPLE NO. 31

A colloidal dispersion with a solids content of 10% by weight is first prepared, as described under (1a), with the given amounts of water and additives and under the conditions mentioned under (1a) (Temperature in this case: 28° C., for the nature and amount of the modifying agent, see Table I). After letting down the polymerization kettle, it is flushed once with tetrafluoroethylene and the pressure is increased again to 13 bars by passing in tetrafluoroethylene, whilst stirring at the stirring speed customary in polymerization, and is kept at 13 bars by passing in further tetrafluoroethylene.

At the same time as the pressure is increased, 0.31 g of diethylene glycol, in the form of an aqueous solution, are fed into the dispersion by means of a metering pump. Polymerization is carried out at a temperature of 28° C. When a conversion of 75%, relative to the tetrafluoroethylene consumption in stages B and C, has been reached, the modifying agent (see Table I) is metered in. Polymerization is then continued until the solids content of the dispersion reaches 20% by weight.

TABLE I

Preparation and composition of three-shell products

| Example No. | Modifying agent stage A | Modifying agent Amount added % by weight | Incorporation (a) % by weight | Modifying agent stage C | Polymerization stage B and C Feeding in % by weight/ conversion % | Outer shell (c) Incorporation % by weight | Stabilizer Type | Amount (ppm) | Conversion % | Seed polymer, relative to the total polymer, % by weight |
|---|---|---|---|---|---|---|---|---|---|---|
| 1 | CF$_3$—CF=CF$_2$ | 2.3 | 0.8 | CF$_3$—CF=CF$_2$ | 4.0/75 | 0.3 | — | — | — | 8.4 |
| 2 | CF$_3$—CF=CF$_2$ | 2.3 | 0.8 | CF$_3$—CF=CF$_2$ | 4.0/75 | 0.2 | DEG | 20 | Initial component | 8.4 |
| 3 | CF$_3$—(CF$_2$)$_2$—OCF=CF$_2$ | 1.1 | 0.2 | CF$_3$—CF=CF$_2$ | 4.0/75 | 0.3 | — | — | — | 8.4 |
| 4 | CF$_3$—(CF$_2$)$_2$—OCF=CF$_2$ | 1.1 | 0.2 | CF$_3$—CF=CF$_2$ | 4.0/75 | 0.2 | DEG | 20 | Initial component | 8.4 |
| 5 | CF$_2$=CFCl | 1.1 | 1.0 | CF$_3$—CF=CF$_2$ | 4.0/75 | 0.2 | — | — | — | 8.4 |
| 6 | CF$_2$=CFCl | 1.1 | 1.0 | CF$_3$—CF=CF$_2$ | 4.0/75 | 0.2 | DEG | 20 | Initial component | 8.4 |
| 7 | CF$_3$CF=CF$_2$ | 2.7 | 0.9 | CF$_3$—CF=CF$_2$ | 4.0/75 | 0.2 | DEG | 20 | 75 | 8.4 |
| 8 | CF$_3$—(CF$_2$)$_2$—OCF=CF$_2$ | 1.1 | 0.2 | CF$_3$—CF=CF$_2$ | 4.0/75 | 0.2 | DEG | 20 | 75 | 8.4 |
| 9 | CF$_2$=CFCl | 1.1 | 1.0 | CF$_3$—CF=CF$_2$ | 4.0/75 | 0.2 | DEG | 20 | 75 | 8.4 |
| 10 | CF$_3$—CF=CF$_2$ | 2.2 | 1.0 | CF$_3$—CF=CF$_2$ | 0.7/25 | 0.3 | DEG | 20 | 25 | 8.4 |
| 11 | CF$_3$—CF=CF$_2$ | 2.2 | 1.0 | CF$_3$—CF=CF$_2$ | 1.0/50 | 0.4 | DEG | 20 | 50 | 8.4 |
| 12 | CF$_3$—CF=CF$_2$ | 2.2 | 1.0 | CF$_3$—CF=CF$_2$ | 1.3/62 | 0.6 | DEG | 20 | 62 | 8.4 |
| 13 | CF$_3$—CF=CF$_2$ | 2.2 | 1.0 | CF$_3$—CF=CF$_2$ | 2.0/75 | 0.1 | DEG | 20 | 75 | 8.4 |
| 14 | CF$_2$—CF=CF$_2$ | 2.2 | 1.0 | CF$_3$—(CF$_2$)$_2$—OCF=CF$_2$ | 2.0/75 | 0.5 | DEG | 20 | 75 | 8.4 |
| 15 | CF$_3$—CF=CF$_2$ | 1.7 | 0.8 | CF$_3$—CF=CF$_2$ | 2.4/50 | 0.5 | DEG | 20 | 50 | 8.4 |
| 16 | CF$_3$CF=CF$_2$ | 1.7 | 0.8 | CF$_3$—CF=CF$_2$ | 2.4/50 | 0.3 | DEG | 20 | 50 | 9.6 |
| 17 | CF$_3$CF=CF$_2$ | 1.7 | 0.8 | CF$_3$—CF=CF$_2$ | 2.4/50 | 0.3 | DEG | 20 | 50 | 10.8 |
| 18 | CF$_3$CF=CF$_2$ | 2.2 | 1.1 | CF$_3$—CF=CF$_2$ | 2.1/62 | 0.3 | DEG | 20 | 62 | 8.4 |
| 19 | CF$_3$—CF=CF$_2$ | 2.2 | 1.1 | CF$_3$—CF=CF$_2$ | 2.1/62 | 0.3 | DEG | 40 | 62 | 8.4 |
| 20 | CF$_3$—CF=CF$_2$ | 2.2 | 1.1 | CF$_2$=CF=CF$_2$ | 2.1/62 | 0.4 | DEG | 60 | 62 | 8.4 |
| 21 | CF$_2$=CF=CF$_2$ | 10 | 2 | CF$_2$=CF=CF$_2$ | 2.1/62 | 0.4 | DEG | 80 | 62 | 8.4 |
| 22 | CF$_3$—CF=CF$_2$ | 2.2 | 1.0 | CF$_3$—CF=CF$_2$ | 2.0/75 | 0.6 | DEG | 20 | 75 | 8.4 |
| 23 | CF$_3$—CF=CF$_2$ | 2.2 | 1.0 | CF$_3$—(CF$_2$)$_2$—O—CF=CF$_2$ | 20/75 | 1.6 | DEG | 30 | Initial component | 8.4 |
| 24 | CF$_3$—CF=CF$_2$ | 2.2 | 0.6 | CF$_3$—CF=CF$_2$ | 200/98.5 | 10.0 | Dioxan | 20 | Initial component | 7.2 |
| 25 | CF$_3$—CF=CF$_2$ | 2.8 | 0.9 | CF$_3$—CF=CF$_2$ | 20/96 | 4.0 | DEG | 20 | Initial component | 7.2 |
| 26 | CF$_3$—CF=CF$_2$ | 2.2 | 0.6 | CF$_3$—CF=CF$_2$ | 5.0/80 | 1.0 | Dioxan | 20 | Initial component | 11.0 |
| 27 | CF$_3$—CF=CF$_2$ | 2.2 | 0.6 | CF$_3$—CF=CF$_2$ | 5.0/96 | 0.6 | Dioxan | 20 | Initial component | 7.2 |
| 28 | CF$_3$—CF=CF$_2$ | 2.2 | 0.6 | CF$_2$=CH$_2$ | 16.0/95 | 8.0 | Dioxan | 20 | Initial component | 8.9 |
| 29 | CF$_3$—CF=CF$_2$ | 2.2 | 0.6 | CF$_2$=CFCl | 26.7/97 | 12.5 | Dioxan | 20 | Initial component | 9.0 |
| 30 | CF$_3$—CF=CF$_2$ | 2.2 | 0.6 | CF$_3$(CF$_2$)$_2$OCF=CF$_2$ | 13.3/97 | 1.6 | Dioxan | 20 | Initial component | 7.2 |
| 31 | CF$_2$=CFCl | 2.9 | 2.6 | CF$_3$—CF=CF$_2$ | 2.4/75 | 0.6 | DEG | 10 | 45 | 45 |
| 32 | CF$_3$—CF=CF$_2$ | 2.2 | 0.6 | CF$_3$—CF=CF$_2$ | 20/96 | 0.7 | DEG | 20 | Initial component | 7.2 |
| 33 | CF$_3$—CF=CF$_2$ | 1.8 | 1.4 | CF$_3$—CF=CF$_2$ | 1.3/62 | 0.3 | Dioxan | 20 | 62 | 11.8 |

TABLE I-continued

Preparation and composition of three-shell products

| | | Modifying agent | | | Polymerization stage B and C | | | | | Seed polymer, relative to the total polymer, % by weight |
|---|---|---|---|---|---|---|---|---|---|---|
| | | Amount added | Incorporation (a) | Modifying agent | Feeding in % by weight/ | Outer shell (c) Incorporation % | Stabilizer | | | |
| Example No. | Modifying agent stage A | % by weight | | stage C | conversion % | by weight | Type | Amount (ppm) | Conversion % | |
| 34 | $CF_3-CF=CF_2$ | 30 | 4.5 | $CF_3-CF=CF_2$ | 1.3  62 | 0.3 | Dioxan | 20 | 62 | 8.4 |
| 35 | $CF_2=CFCl$ | 2.9 | 2.7 | $CF_2=CFCl$ | 10.0  96 | 3.5 | DEG | 20 | Initial component | 7.7 |
| 36 | $CF_2=CFCl$ | 3.2 | 3.0 | $CF_2=CFCl$ | 2.0  96 | 1.5 | DEG | 20 | Initial component | 7.2 |
| 37 | $CF_2=CFCl$ | 1.4 | 1.3 | $CF_2=CFCl$ | 2.0  96 | 1.5 | DEG | 20 | Initial component | 8.4 |
| 38 | $CF_2=CFCl$ | 1.4 | 1.3 | $CF_2=CFCl$ | 5.0  96 | 3.4 | DEG | 20 | Initial component | 8.4 |
| 39 | $CF_2=CFCl$ | 0.5 | 0.5 | $CF_2=CFCl$ | 5.0  96 | 4.5 | DEG | 20 | Initial component | 8.4 |
| 40 | $CF_2=CH_2$ | 0.5 | 0.5 | $CF_2=CH_2$ | 2.5  96 | 2.4 | DEG | 20 | Initial component | 8.4 |
| 41 | $CF_2=CFCl$ | 1.4 | 1.3 | $CF_2Cl-CF_2-O-CF=CF_2$ | 10  96 | 1.5 | DEG | 20 | Initial component | 8.4 |
| 42 | $CF_2=CFCl$ | 1.4 | 1.3 | $HCF_2(CF_2)_2-O-CF=CF_2$ | 10  96 | 1.3 | DEG | 20 | Initial component | 8.4 |
| 43 | $CFH=CF_2$ | 0.6 | 0.5 | $CFH=CF_2$ | 2.5  96 | 2.2 | DEG | 20 | Initial component | 8.4 |
| 44 | $CF_2=CFCl$ | 1.4 | 1.3 | $CF_3-O-CF=CF_2/CF_2=CFCl$ (25:75% % by weight) | 10  96 | 1.8 | DEG | 20 | Initial component | 8.4 |

(3) IR DETERMINATION OF THE CONTENT OF MODIFYING AGENT (IR spectrometer PE 137, NaCl prism)

(3.1) Trifluorochloroethylene

The content of trifluorochloroethylene in the seed polymer is determined from the next absorption of the band at 957 cm$^{-1}$ by comparison with the net absorption of the band at 2360 cm$^{-1}$. The trifluorochloroethylene content is given directly from the intensity ratio of the two bands.

(3.2) Perfluoropropene

The content of perfluoropropene in the seed polymer is determined by measuring the net absorption of the band at 982 cm$^{-1}$ and comparing this with the net absorption of the band at 2360 cm$^{-1}$. The resulting quotient is multiplied by 4.5.

The content of perfluoropropene in the shell is determined by the following method:

(a) determination of the perfluoropropene content in the three-shell product.

(b) Subtraction of the perfluoropropene content of the seed core (see Example 1, seed core: X % by weight of the end polymer), which is separately determined using the seed.

(c) For conversion to the shell content, the perfluoropropene content determined by the above method must be multiplied by the following correction factor: Shell factor = [100 — (% by weight of seed polymer, relative to the end polymer)]/[100 — % conversion on feeding in].

(3.3) Perfluoro(propylvinyl)-ether

To determine the content, the net absorption of the band at 995 cm$^{-1}$ is compared with the net absorption of the band at 2360 cm$^{-1}$. Multiplication of the resulting quotient by 0.95 gives the content. A correction method analogous to that in 3.2 applies for the determination of the perfluoro(propylvinyl)-ether content of the shell.

(3.4) Determination of perfluoro(propylvinyl)-ether in the presence of perfluoropropene (HFP)

If both comonomers are simultaneously present in a product, because of the overlapping of the perfluoropropene band (982 cm$^{-1}$) and the perfluoro(propylvinyl)-ether band (995 cm$^{-1}$), the compensation method given in U.S. Pat. No. 4,029,863 is applied, using TFE/HFP copolymer films of equal thickness. In this case also, the proportion in the shell is obtained by subsequent multiplication by the abovementioned shell factor.

(3.5) Vinylidene fluoride, trifluoroethylene, chlorotetrafluoroethylene perfluorovinyl ether and ω-hydrohexafluoropropyl perfluorovinyl ether are determined in the residual gas of the polymer batch by gas chromatography.

(4) WORKING UP FOR USE AS A PASTE EXTRUSION MATERIAL

The resulting 20% strength dispersion is diluted to a solids content of 10% by weight and stirred with a three-bladed propeller-type stirrer in a 100 l glass vessel at 35° C. After washing three times with in each case 60 l of deionized water, the powder is dried at 130° C. (180° C. in Example 22).

(5) STRAND EXTRUSION BY THE PASTE EXTRUSION PROCESS (TABLES II AND III)

The extrusion properties are determined by the test method described below:

220 g of the polymer which is obtained in the particular example and has been coagulated and dried, according to (4), are first mixed with 48.3 g of a hydrocarbon mixture (white spirit, boiling range: 190° to 260° C.) and the mixture, in a cylindrical vessel (500 cm$^3$), is then rolled on a roller stand at 100 rpm at 23° C. for 20 minutes and is left to stand overnight. The homogenized mixture is preshaped to a cylindrical preform (length: 40 cm; diameter; 3 cm) under 4 bars with the aid of a ram press and is extruded at a rate of 20 mm/minute with the aid of a ram stroke via a conically shaped reducer into a cylindrical die (for a reduction ratio of 1600:1, conical orifice angle: 60°, length: 32 mm, diameter: 0.8 mm; for a reduction ratio of 4000:1, conical orifice angle: 30°, length: 32 mm, diameter 0.5 mm). The quality of the extrudate is evaluated according to the following scale:

Rating 1 = completely smooth surface
Rating 2 = slightly wavy surface
Rating 3 = wavy surface
Rating 4 = discontinuous extrudate.

The course of the pressure is recorded by a pen-recorder and is read off when a constant level is established.

(6) WIRE EXTRUSION BY THE PASTE EXTRUSION PROCESS (TABLES II AND III)

The extrusion of electrical conductors is carried out with a Jennings wire extruder, model CEB 233-05. The die diameter is 1.47 mm for a reduction ratio of 1450:1 and 0.965 mm for a reduction ratio of 2670:1. In the extrusion of jacketed electrical conductors, the reduction ratio (RR) is understood as the following area ratio:

$$\frac{\text{Cross-sectional area of the preform}}{\text{Cross-sectional area of the die orifice} - \text{cross-sectional area of the conductor.}}$$

A seven-stranded, silvered copper wire (silver layer: 2μ) corresponding to AWG standard No. 22 (= American Wire Gauge) with a total conductor diameter of 0.76 mm is used (at a RR of 1450:1). At a RR of 2670:1, a single-stranded, silvered copper wire (AWG 30; silver layer: 2μ) with a total conductor diameter of 0.25 mm is used. Shell Special Gasoline with a boiling range of 100° to 125° C. is used as the lubricant.

The proportion of lubricant is 17.3% by weight, relative to the mixture, in Examples 39 and 41 to 44 and is 18% by weight in all the other examples. The preform, which is precompressed under a pressure of 90 bars, of polymer and lubricant (diameter: 50 cm, height: 40 cm) is introduced into the pressure cylinder of the wire extruder and the conductor is passed through the bored mandrel, the wire guide and the die. In order to draw off the lubricant, the wire then runs over a 4 m drying zone, and finally over a sintering zone with a length of 6 m and with temperatures which increase from about 280° C. to 420° C., to a winding up device. The take-off rate is 15 m/minute.

After the take-off device, the insulated conductor proceeds through the apparatus for detecting electrical defects to the winding up device. A breakdown tester from Messrs. Richter (Debring bei Bamberg, Federal Republic of Germany), type HT 1, is utilized as the apparatus for detecting electrical defects. Testing is carried out at a test voltage of 3.5 kV (in accordance with VDE measuring specification 0881) and at a frequency of 100 Hertz. The number of electrical discharges per 1000 m length of the jacketed conductor is recorded. The thickness of the sintered insulation is 250μ in the case of the experiments with a RR of 1450:1 and 200μ in the case of the experiments with a RR of 2670:1.

sheets is measured in accordance with the method of the ASTM standard D-1457-66. The stability to heat is determined by storing the sheets at 360° C. for 24 hours and determining the weight loss by re-weighing.

TABLE II

SSG density, stability to heat and paste extrusion of three-shell products

| Product of Example No. | SSG density g/cm³ | Stability to heat, weight loss (24 hours, 360°) % | Strand extrusion RR 1600:1 Pressure bars | Strand extrusion RR 1600:1 Evaluation | Strand extrusion RR 4000:1 Pressure bars | Strand extrusion RR 4000:1 Evaluation | Wire extrusion RR 1450:1 Pressure bars | Wire extrusion RR 1450:1 Transparency rating | Wire extrusion RR 1450:1 Electrical discharges per 1000 m | Wire extrusion RR 2670:1 Pressure bars | Wire extrusion RR 2670:1 Transparency rating | Wire extrusion RR 2670:1 Electrical discharges per 1000 m |
|---|---|---|---|---|---|---|---|---|---|---|---|---|
| 1 | 2.176 | 0.045 | 605 | 1 | 900 | 3–4 | — | — | — | — | — | — |
| 2 | 2.210 | 0.075 | 600 | 1–2 | 860 | 2–3 | — | — | — | — | — | — |
| 3 | 2.159 | 0.030 | 608 | 1–2 | 840 | 3–4 | — | — | — | — | — | — |
| 4 | 2.209 | 0.075 | 529 | 2 | 625 | 3–4 | — | — | — | — | — | — |
| 5 | 2.182 | 0.050 | 640 | 1–2 | 840 | 3–4 | — | — | — | — | — | — |
| 6 | 2.217 | 0.090 | 575 | 1 | 943 | 2 | — | — | — | — | — | — |
| 7 | 2.187 | 0.045 | 525 | 1 | 900 | 1–2 | 530 | 1 | 0 | 850 | 1–2 | 2 |
| 8 | 2.175 | 0.030 | 530 | 1 | 850 | 1–2 | 550 | 1 | 0 | 850 | 1–2 | 1 |
| 9 | 2.195 | 0.090 | 550 | 1 | 900 | 1–2 | 570 | 1 | 0 | 920 | 1–2 | 1 |
| 10 | 2.197 | 0.090 | 640 | 1 | 1110 | 1–2 | 660 | 1 | 0 | 1000 | 1–2 | 2 |
| 11 | 2.187 | 0.075 | 515 | 1 | 940 | 1–2 | 530 | 1 | 0 | 950 | 1–2 | 1 |
| 12 | 2.194 | 0.070 | 475 | 1 | 920 | 1 | 480 | 1 | 1 | 900 | 1–2 | 2 |
| 13 | 2.186 | 0.065 | 468 | 1 | 856 | 1 | 470 | 1 | 0 | 890 | 1–2 | 2 |
| 14 | 2.163 | 0.06 | 665 | 1 | 1045 | 2 | 660 | 1 | 0 | 1100 | 2–3 | 5 |
| 15 | 2.183 | — | 654 | 1 | 1080 | 1–2 | 660 | 1 | 1 | 1100 | 1–2 | 2 |
| 16 | 2.197 | — | 625 | 1 | 1090 | 1–2 | 640 | 1 | 0 | 1080 | 1–2 | 1 |
| 17 | 2.196 | — | 671 | 1 | 1120 | 1–2 | 680 | 1–2 | 2 | 1140 | 1–2 | 1 |
| 18 | 2.191 | — | 581 | 1 | 1025 | 1–2 | 600 | 1 | 1 | 1050 | 1–2 | 2 |
| 19 | 2.193 | — | 584 | 1 | 1013 | 1–2 | 590 | 1 | 0 | 1020 | 1–2 | 0 |
| 20 | 2.200 | — | 566 | 1 | 956 | 1–2 | 570 | 1 | 2 | 980 | 1–2 | 0 |
| 21 | 2.185 | — | 615 | 1 | 1040 | 1–2 | 620 | 1 | 0 | 1050 | 1–2 | 1 |
| 22 | 2.186 | — | 520 | 1 | 885 | 1–2 | 525 | 1 | 1 | 900 | 1–2 | 1 |
| 33 | 2.186 | — | 520 | 1–2 | 1090 | 2 | — | — | — | — | — | — |
| 35 | 2.199 | — | 600 | 1–2 | 900 | 2 | 590 | 1 | 2 | 900 | 1–2 | 2 |
| 36 | 2.195 | 0.075 | 700 | 1–2 | 1000 | 2 | 710 | 1 | 1 | 1100 | 1–2 | 3 |
| 37 | 2.195 | 0.070 | 700 | 1–2 | 1020 | 2 | 700 | 1 | 0 | 1080 | 1–2 | 2 |
| 38 | 2.200 | 0.075 | 560 | 1–2 | 860 | 2 | 540 | 1 | 0 | 850 | 1–2 | 1 |
| 39 | 2.236 | 0.095 | 470 | 1–2 | 800 | 2 | 580 | 1–2 | 2 | 950 | 1–2 | 3 |
| 40 | 2.232 | 1.945 | 650 | 1–2 | 920 | 2 | 700 | 1–2 | 3 | 1050 | 1–2 | 4 |
| 41 | 2.206 | 0.075 | 500 | 1–2 | 850 | 2 | 680 | 1–2 | 1 | 1000 | 1–2 | 2 |
| 42 | 2.197 | 0.065 | 600 | 1–2 | 900 | 2 | 700 | 1–2 | 0 | 1000 | 1–2 | 2 |
| 43 | 2.235 | 0.090 | 600 | 1–2 | 930 | 2 | 720 | 1–2 | 2 | 1100 | 1–2 | 3 |
| 44 | 2.190 | 0.070 | 530 | 1–2 | 870 | 2 | 620 | 1–2 | 2 | 990 | 1–2 | 3 |

The transparency of the resulting insulations is evaluated in accordance with the following scale:

Rating 1: Insulation completely clear. Metallic conductor shines through in original color.
Rating 2: Insulation slightly cloudy. Original color of the metallic conductor can no longer be recognized.
Rating 3: Insulation has some opaque places. Metallic conductor can still be recognized visually. Generally increased cloudiness.
Rating 4: Over 50% of the insulation is opaque. Metallic conductor can only still be recognized in places.
Rating 5: Insulation almost completely opaque. Metallic conductor can no longer be recognized.

(7) STABILITY TO HEAT AND SSG DENSITY (TABLES II AND III)

Circular sintered sheets (diameter: 10 cm; thickness: 6 mm; molding pressure: 50 bars) of in each case 100 g of powder are produced for these determinations. Sintering of the sheets is effected by heating to 375° C. (half an hour), keeping them at 375° C. for 1 hour and then cooling them by 60° C./hour. The SSG density of the

(8) TAPE EXTRUSION TO UNSINTERED TAPES AND STRETCHING THEREOF (SEE TABLE III)

Stand extrusion

The strands are produced on a paste extruder from Messrs. Havelook under the following conditions:
Lubricant: Benzine with a boiling point of 244° to 332° C., in an amount of 25% by weight, relative to the three-shell polymer
Preform molding pressure: 30 bars
Die diameter: 11.2 mm (70 μm tapes)
Die temperature: 50° C.
Rate of extrusion: about 1.5 m/minute
Reduction ratio: 30:1 (70 μm tapes)

The extruded strands are wound up on drums with a diameter of about 80 cm and are calendered as soon as possible (as a rule after 0.5 to 3 hours).

Calendering

Calendering of the strands to tapes 70 μm thick is effected on a two-roll calender from Messrs. Havelook under the following conditions:
Roll diameter: 300 mm
Roll width: 300 mm
Output: 34 m/minute
Roll temperature: 50° C.
Strand temperature: room temperature (about 23° C.)

The calendered tapes are wound up and freed from lubricant.

The lubricant is freed in a bath containing hot perchloroethylene (about 100° C.), through which the tape is drawn at a speed of about 1.5 m/minute. The tapes are then stretched.

Stretching

The tapes which have been freed from the lubricant are stretched on a stretching unit at temperatures of 230° to 240° C. Stretching is effected between two rolls, of which the ratio of the speeds of rotation is infinitely adjustable, depending on the stretching ratio. Table III shows the stretching ratio at which defects (for example holes or fibrillation at the edge) or a complete tear across the entire width occurs for the first time when the stretching ratio is increased continuously.

TEST METHODS

Tensile strength

The tensile strength is tested in accordance with the method of ASTM standard D-1457/test rod in accordance with ASTM standard 1708. The take-off rate is 300 mm/minute.

2 values are tested along the direction of extrusion (or direction of calendering) and 1 value is tested at right angles thereto.

In the test at right angles to the direction of extrusion, the force at the moment of break, or, if the elongation is greater than 400%, the force which is reached at 400% elongation, is given.

Elongation at break

The stress-elongation diagram is also recorded in determining the tensile strength along the direction of extrusion. The elongation at the value of 60% of the maximum tensile strength on the descending side of the stress-elongation curve is read off. The elongation at break at right angles to the direction of extrusion cannot be determined, since still no break occurs at 400% elongation.

Density

A piece 50×20 mm in size is stamped out with a punching tool. The thickness of this piece is measured at various points and the density is calculated via the volume and weight.

(9) PRECIPITATION GRANULATION FOR USE AS A PRESS-SINTER POWDER OR FOR USE IN RAM EXTRUSION 4 kg of colloidal dispersion obtained according to Example 14, Table I (20% by weight of solids) is diluted to a solids content of 10% by weight in a 10 l glass vessel, provided with a propeller-type stirrer and a high-frequency stirrer ("Ultra-Turrax ®," type Lutz 4/22-640), and precipitation is effected by adding concentrated hydrochloric acid (10 cm$^3$) at room temperature, whilst stirring and at the same time with the high-frequency stirrer running. During six washings with in each case 6 l of deionized water, the high-frequency stirrer is also allowed to run three times, in each case for one minute. 4.4 l of deionized water are added to the still moist, coagulated fine powder thus obtained. After adding 430 cm$^3$ of gasoline (boiling point: 80° to 110° C.), the speed of the propeller-type stirrer is increased and at the same time the high-frequency stirrer is also switched on for 3 minutes. The mixture is then subsequently stirred at a reduced speed for 1 hour. After filtering off the water, the granules are dried at 280° C. for 6 hours.

This product is found to have the following properties: bulk density: 870 g/l; no cracks at all are formed in a sliced film from a sintered block of 1 kg, down to a diameter of 4.9 cm, and this sliced film furthermore has a tensile strength of 34 N/mm$^2$, an elongation at break of 680% and an electrical breakdown strength of 60 KV/mm.

These values are obtained as follows::

Bulk density

Determination in accordance with the method of DIN standard 53 468

Tests on 1 kg sintered blocks 1 kg sintered blocks are produced by compressing the powder with a compression pressure of 250 barsand then sintering (4 hours at 375° to 380° C.) and cooling (45° C./hour). The diameter is 10 cm.

Formation of cracks, mechanical values and electrical breakdown strength

The sintered 1 kg blocks are veneer-cut, in the form of a 200μ film, down to an inner core (diameter: 4.9 cm), and the diameter of the uncut residual block when the first cracks appear is taken as the basis for the measure of the formation of cracks. The tensile strength and

TABLE III

| | SSG density, strand extrusion and properties of extruded, unsintered tapes | | | | | Properties of tape | | | | | |
|---|---|---|---|---|---|---|---|---|---|---|---|
| Product from | | Stability to heat Weight loss | Strand extrusion RR 580:1 | | | Width | Density | Stretching ratio | | Tensile strength Longitudinal/perpendicular | Elongation at break longitudinal/perpendicular |
| Example No. | SSG density g/cm$^3$ | (24 hours, 360°) % | Pressure bars | Rating | Edge Rating | (unstretched) mm | g/cm$^3$ | Defects 1:x | Tear 1:x | N/mm$^2$ | % |
| 24 | 2.163 | 0.037 | 500 | 1 | 1–2 | 135 | 1.50 | 1:16 | 1:22 | 6.6/0.68 | 190/>400 |
| 25 | 2.159 | 0.031 | 600 | 1–2 | 1–2 | 135 | 1.44 | 1:17 | 1:22 | 6.6/0.63 | 210/>400 |
| 26 | 2.169 | 0.045 | 435 | 1–2 | 2–3 | 130 | 1.60 | 1:9 | 1:16 | 12.0/0.87 | 204/>400 |
| 27 | 2.159 | 0.023 | 675 | 2–3 | 1–2 | 125 | 1.53 | 1:13 | 1:22 | 9.3/0.73 | 197/>400 |
| 28 | 2.172 | 0.502 | 625 | 1–2 | 1–2 | 125 | 1.48 | 1:18 | 1:22 | 8.4/0.71 | 212/>400 |
| 29 | 2.169 | 0.037 | 560 | 2 | 1–2 | 135 | 1.52 | 1:10 | 1:16 | 8.1/0.69 | 227/>400 |
| 30 | 2.155 | 0.026 | 620 | 2 | 2 | 130 | 1.69 | 1:11 | 1:18 | 11.3/0.89 | 175/>400 |
| 31 | 2.221 | — | 535 | 1–2 | 2 | 125 | 1.56 | 1:4 | 1:8 | 12.0/1.3 | 180/>400 |
| 32 | 2.157 | 0.035 | 600 | 2 | 2 | 135 | 1.45 | 1:16 | 1:20 | 7.0/0.75 | 200/>400 | elongation at break are measured on the resulting veneer-cut films in accordance with the method of ASTM standard 1457-62 T. The electrical breakdown strength is determined in accordance with the VDE specification 03 03/T 2. Testing apparatus: insulation-tester from Messrs. Messwandler, Bau GmbH, Bamberg, Federal Republic of Germany, form IPG 30/05; electrodes: upper ball 20 mm diameter, lower plate 50 mm diameter.

(10) RAM EXTRUSION

A partially sintered powder obtained by precipitation granulation according to (9) (product from Example 14) and by subsequent heat treatment (30 minutes at 340° C.) is extruded to tubes (internal diameter 32 mm; external diameter 39 mm) with the aid of a ram extruder (sinter zone length: 800 mm, temperature program in the direction of extrusion: 380, 390, 380° C.; output: 3 m/hour). Small plates 2 mm thick are milled out of the rods in the direction of extrusion, and test pieces are in turn stamped out of these plates and their tensile strength and elongation at break (longitudinal) are determined in accordance with the method of ASTM 1708: Ts: 22.3 N/mm$^2$; Eb: 355%. The tubes are turned to a wall thickness of 2 mm and test pieces are punched out in the direction of extrusion and used for measuring the tensile strength and elongation at break (perpendicular) in accordance with the method of ASTM 1708: Ts: 20.4 N/mm$^2$; Eb: 325%.

(11) COATING OF GLASS FABRIC

A desized glass fabric with a linen weave and a weight per unit area of 300 g/m$^2$ is impregnated three times, with the aid of a coating machine, with a dispersion described below and is then dried. The conveying speed is 0.4 m/minute, the temperatures of the drying zones are 319° C., 397° C. and 464° C. and the coating achieved is about 200 g/m$^2$. The dispersion employed is a mixture consisting of 25 kg of polytetrafluoroethylene dispersion with a solids content of 60% by weight, 1.61 kg of the product of Example 23, Table I of this Application, precipitated in finely pulverulent form (average particle size d$_{50}$: 15 μm), 435 g of a nonylphenol oxyethylated with on average 10 ethylene oxide units, and 0.58 kg of a silicone resin emulsion (methylphenylpolysiloxane and 25% by weight of xylene).

Testing of the coated glass fabric thus obtained gave the following values: tensile strength (determined in accordance with the method of DIN standard 53 857): 2240 N/5 cm breadth of the strip; tear propagation resistance (tested in accordance with the method of DIN standard 53 356): 76 N.

We claim:

1. Aqueous polymer dispersion containing colloidal particles of a partially modified tetrafluoroethylene polymer with a multi-shell particle structure of shells of different composition, said particles consisting essentially of
   (a) a particle core comprising a polymer of 0.05 to 6% by weight of units of at least one modifying fluoro-olefinic comonomer of the formulae

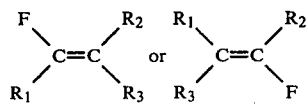

wherein R$_1$ is H, Br or Cl; R$_2$ is F or R$_f^1$, R$_f^1$ denoting a perfluoroalkyl radical with 1 to 4 C atoms; and R$_3$ is R$_1$ or R$_2$;

wherein R$_f^1$ is a perfluoroalkyl radical with 1 to 4 C atoms and R$_f^2$ is F or a perfluoromethyl radical;

wherein R$_f^3$ is a perfluoroalkyl radical with 1 to 5 C atoms; or

wherein R$_4$ is a radical XCF$_2$—(CF$_2$)$_m$— in which X is H or Cl and m denotes an integer from 0 to 4, and units of tetrafluoroethylene, the proportion of the particle core being 5 to 20% by weight of the total particle,
   (b) an inner particle shell, immediately adjacent to the particle core, of a polymer consisting of tetrafluoroethylene units, and
   (c) an outer particle shell, immediately adjacent to the inner particle shell, of a polymer comprising 0.1 to 15% by weight of units of at least one modified, fluoro-olefinic comonomer of the formulae (a$^1$), (a$^2$), (a$^3$), and (a$^4$), these formulae being as defined under (a), and units of tetrafluoroethylene, the weight ratio of the inner particle shell to the outer particle shell being 75:25 to 99.5:0.5.

2. Aqueous fluoropolymer dispersion as claimed in claim 1 wherein the particle core consists of 0.1 to 5% by weight of units of the modifying fluoro-olefinic comonomer and of tetrafluoroethylene units.

3. Aqueous fluoropolymer dispersion as claimed in claim 1 wherein the outer particle shell comprises a polymer consisting of 0.1 to 12% by weight of units of the modifying fluoro-olefinic comonomer and tetrafluoroethylene units.

4. Aqueous fluoropolymer dispersion as claimed in claim 1 wherein the modifying fluoro-olefinic comonomer in the particle core is at least one comonomer from the group comprising perfluoropropene, perfluoro(propylvinyl)-ether, chlorotrifluoroethylene and vinylidene fluoride.

5. Aqueous fluoropolymer dispersion as claimed in claim 1 wherein the modifying fluoro-olefinic comonomer in the outer particle shell is at least one comonomer from the group comprising perfluoropropene, perfluoro(propylvinyl)-ether, chlorotrifluoroethylene and vinylidene fluoride.

6. Coagulated fluoropolymer resin powder which consists of primary particle agglomerates with an average particle diameter of 200 to 800 μm in which the primary particles are built up as claimed in any one of claims 1 to 5.

7. A process for the preparation of aqueous fluoropolymer dispersions containing colloidal particles of a partially modified tetrafluoroethylene polymer with a multi-shell particle structure of shells of different composition as claimed in claim 1 by emulsion polymerization of tetrafluoroethylene with modifying fluoro-olefinic comonomers copolymerizable with tetrafluoroethylene, in the presence of catalysts and emulsifiers which comprises (A) first preparing a colloidal seed dispersion with a polymer solids content of 3 to 18% by weight, relative to the total weight of the aqueous seed dispersion, by emulsion polymerization of tetrafluoroethylene and at least one modifying fluoro-olefinic comonomer of the formulae

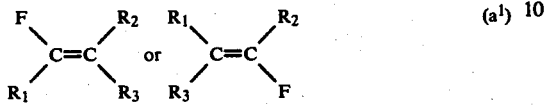 (a¹)

wherein $R_1$ is H, Br, or Cl; $R_2$ is F or $R_f^1$, $R_f^1$ denoting a perfluoroalkyl radical with 1 to 4 C atoms; and $R_3$ is $R_1$ or $R_2$;

 (a²)

wherein $R_f^1$ is a perfluoroalkyl radical with 1 to 4 C atoms and $R_f^2$ is F or a perfluoromethyl radical;

 (a³)

wherein $R_f^3$ is a perfluoroalkyl radical with 1 to 5 C atoms; or

 (a⁴)

wherein $R_4$ is a radical $XCF_2-(CF_2)_m-$ in which X=H or Cl and m denotes an integer from 0 to 4, the amount of this fluoro-olefinic comonomer being such that the proportion of its units in the seed particles formed is 0.05 to 6% by weight; discontinuing the polymerization by letting down the pressure and removing the monomer phase;

(B) then continuing the emulsion polymerization in the presence of this colloidal seed dispersion from stage (A), if appropriate after reducing the solids content by dilution, by forcing in tetrafluoroethylene and continuing to feed in tetrafluoroethylene to maintain a pressure of 5 to 30 bars, until the solids content of the final dispersion has reached 8 to 40% by weight, the amount of colloidal seed dispersion present being such that the particle cores formed from the seed particles comprise 5 to 20% by weight of the particles of the final dispersion, and (C) feeding at least one modified fluoro-olefinic comonomer of the formulae (a¹), (a²), (a³), and (a⁴) wherein these formulae are as defined under (A), into the continuing emulsion polymerization of stage (B) when a degree of conversion in the range from 75 to 99.5% by weight has been reached, relative to the consumption of tetrafluoroethylene up to the intended solids content of the final dispersion, the amount fed in being such that the proportion of comonomer units in the outer particle shell which forms is 0.1 to 15% by weight.

8. A process as claimed in claim 7 wherein the emulsion polymerization in stage (B) is continued by passing in tetrafluoroethylene until the solids content of the final dispersion reaches 12 to 30% by weight.

9. A process as claimed in claim 7 wherein the emulsion polymerization in stage (B) is continued by passing in tetrafluoroethylene until the solids content of the final dispersion reaches 15 to 25% by weight.

10. A process as claimed in claim 7 wherein the modifying fluoro-olefinic comonomer is fed into stage (C) in an amount such that the proportion of units thereof in the outer particle shell formed is 0.1 to 12% by weight.

11. A process as claimed in claim 7 wherein the colloidal seed dispersion prepared in a separate operation according to stage (A) is introduced before continuing the emulsion polymerization according to stage (B), the amount of catalyst and emulsifier required for stage (B) being added at the start of stage (B).

12. A process as claimed in claim 7 wherein the emulsion polymerization in stage (B) and (C) is carried out in the presence of dispersion stabilizers.

13. A process as claimed in claim 7 wherein the dispersion stabilizers are added approximately when feeding in of the comonomer, according to stage (C), starts.

14. A process as claimed in claim 7 wherein a non-polymerizable, non-fluorinated chain transfer agent is present in at least one of stages (A), (B), and (C).

* * * * *